# 3,330,811
BITHIAZOLE POLYAMIDES
James M. Craven, Wilmington, Del., assignor to E. I. du Pont de Nemours and Company, Wilmington, Del., a corporation of Delaware
No Drawing. Filed Aug. 13, 1963, Ser. No. 301,903
4 Claims. (Cl. 260—78)

This invention relates to bithiazole polyamides. It is more particularly directed to bithiazole polyamides having recurring units of the structure (1)
$$\left[\begin{array}{c}R-C\overset{N}{=}C-C\overset{N}{=}C-R_1\\ -C-C-S\quad S-C-C-X-\\ \parallel\quad\quad\quad\quad\quad\parallel\\ O\quad\quad\quad\quad\quad O\end{array}\right]$$

where

X can be

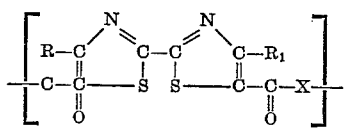

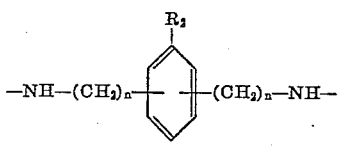

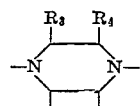

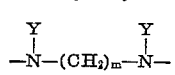

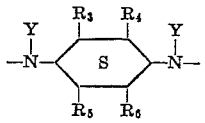

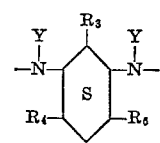

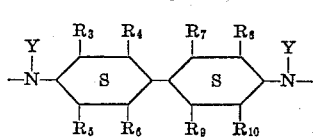

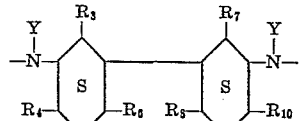

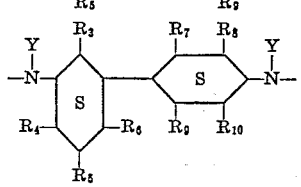

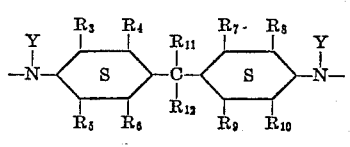

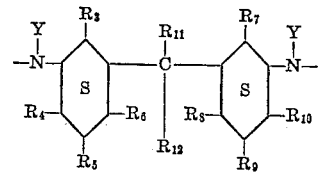

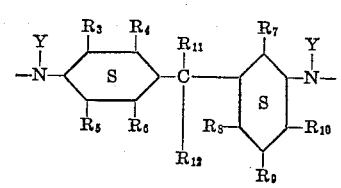

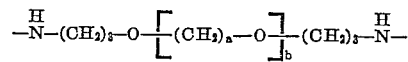

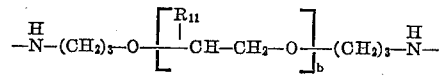

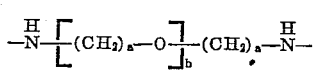

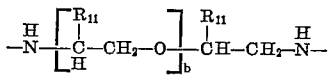

$R$–$R_{10}$ can be hydrogen, methyl or ethyl;
$R_{11}$ and $R_{12}$ can be alkyl of 1–5 carbon atoms;
Y can be hydrogen or an alkyl radical of 1–20 carbon atoms;
$m=2$–$200$;
$n=1$–$12$;
$a=1$–$4$; and
$b=1$–$300$.

This invention is also directed to copolymers of the units of Formula 1 with other difunctional monomers. These copolymers have repeating units of the structure (2)
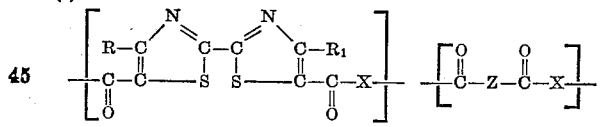

where
X is as defined in Formula 1;
Z is alkylene, cycloalkylene, arylene, alkarylene or aralkylene, each having a total of 1 through 20 carbon atoms,

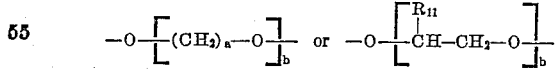

where $b$ and $R_{11}$ are defined as in Formula 1.

It is to be understood that the copolymer monomer units can be arranged in a random or an ordered manner.

UTILITY

The polymers of Formulae 1 and 2 exhibit fluorescence in the blue portion of the spectrum when excited by light in the near ultraviolet range. This makes them suitable for use as optical brighteners.

The fluorescent phenomenon will be imparted to substrates containing or bearing as little as 0.01%, by weight, of the polymers.

When the polymers are used as optical brighteners for natural and synthetic textiles, they can be applied to the fibers by first dissolving the polymers in such solvents as fluorinated ketone hydrates, formic acid or dimethylacetamide, immersing the fibers in the solution and then drying them so that a thin film forms on the surfaces.

When they are used to brighten synthetic fibers, the same coating techniques can be employed, or the polymers and the fiber material can be co-dissolved in a mutual solvent and then spun. Alternatively, when the nature of the fibers and polymers permit, they can be co-melted and spun.

When using the polymers of this invention as whiteners, it is obviously essential to avoid contact with fluorescence quenchers such as resorcinol, hydroquinone, pyrogallol, iodide ion, thiocyanate ion, cupric ion, ferrous ion and nickelous ion.

PREPARATION OF THE POLYMERS

The polymers of Formula 1 can be prepared according to the following general equation:

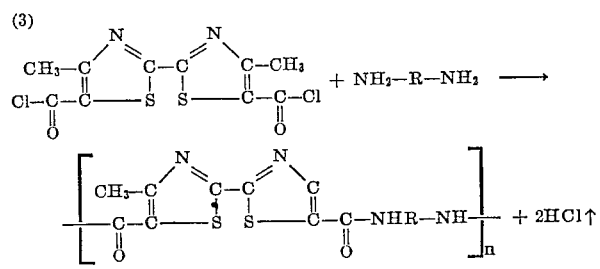

It should be understood that the structural formula shown for the diamine in Equation 3 is representative only and that other diamines, particularly those having aromatic and cyclic structures, can be reacted in the same fashion to given the corresponding polymers of the invention.

The acid chloride starting material is prepared from the corresponding dicarboxylic acid by reacting it with thionyl chloride. This reaction is described in greater detail in P. Karrer and W. Graf, Helv. Chim. Acta., 28, 824–28 (1945).

The polymers of the invention can be prepared according to two basic methods:

(1) Interfacial polymerization

The acid chloride reactant is dissolved in a water-immiscible organic solvent such as benzene, chloroform, or cyclohexane.

The diamine reactant is dissolved in water.

It is necessary to use an acid acceptor in this method to prevent reaction of the hydrogen chloride byproduct with the diamine starting material to give a salt. The acid acceptor used should be soluble in the water-diamine phase. Suitable acid acceptors are sodium carbonate, sodium hydroxide, potassium hydroxide, or potassium carbonate.

The reaction is initiated by bringing the phases together, with rapid stirring.

(2) Solution polymerization

According to this technique, both reactants are separately dissolved in an organic solvent such as benzene, chloroform or cyclohexane. A tertiary amine such as triethylamine, dissolved in the diamine solution, can be used as an acid acceptor.

In either method the reactants should be present in a 1:1 molar ratio. The acid acceptor should naturally be present at a concentration sufficient to neutralize the two moles of hydrogen chloride produced; large excesses should be avoided.

In both methods, the solutions are combined at room temperature, with rapid stirring. Generally speaking, the reactions are almost instantaneous, but should be continued for approximately 15 minutes to insure completion.

The polymeric product usually separates from solution as a solid, which can be filtered off. Sometimes the polymer product is soluble in the organic phase; in that case the solid polymer can be obtained by evaporating the solvent.

In either event, the polymer is washed with water (unless it is water-soluble) and then dried.

The copolymers of Formula 2 can be prepared in a similar fashion by adding one or more additional different difunctional acid chloride reactants to the reaction mass, taking care that the total number of moles of acid chloride reactants always equals the total number of moles of diamine reactant.

EXAMPLES

Example 1

A clear, yellow solution of 6.424 grams (0.02 mole) of 4,4'-dimethyl-5,5'-bis(chlorocarbonyl)-2,2' - bithiazole in 340 ml. of chloroform was added, with rapid stirring, to a solution of 2.284 grams (0.02 mole) of 2,5-dimethylpiperazine and 4.048 grams of triethylamine in 200 ml. of chloroform.

After 35 minutes the clear colorless solution was poured, with stirring, into one liter of hexane to precipitate the polymer, which was then collected by filtration, thoroughly washed with distilled water, and then dried to give 5.27 grams of a white solid having recurring units of the structure

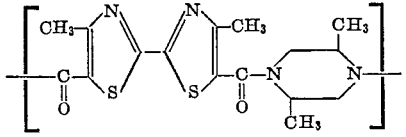

Any of the polymeric products in the following table can be similarly prepared by reacting 4,4'-dimethyl-5,5'-bis(chlorocarbonyl)-2,2'-bithiazole with an equimolar proportion of a corresponding diamine:

| Reactant | Product |
|---|---|
| 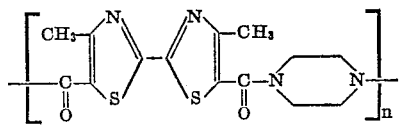 | 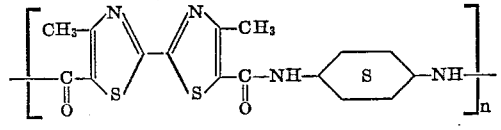 |
| 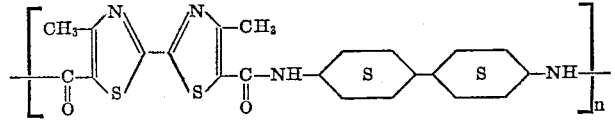 | |
| | |

| Reactant | Product |
|---|---|
| H₂N—⟨S⟩—C(CH₃)₂—⟨S⟩—NH₂ | [—C(=O)—thiazole(CH₃)—thiazole(CH₃)—C(=O)—NH—⟨S⟩—C(CH₃)₂—⟨S⟩—NH—]ₙ |

Example 2

To a solution of 1.162 grams (0.01 mole) of hexamethylenediamine and 2.12 grams (0.02 mole) of anhydrous sodium carbonate in 100 ml. of distilled water was added, with vigorous stirring, a solution of 3.212 grams (0.01 mole) of 4,4' - dimethyl-5,5'-bis(chlorocarbonyl)-2,2'-bithiazole in 300 ml. of dichloromethane.

The product precipitated almost immediately but stirring was continued for 15 additional minutes.

The resulting polymer was then collected by filtration, dropped into boiling water to remove the dichloromethane, collected by filtration, washed with warm water and dried under vacuum.

This polymer had recurring units of the structure

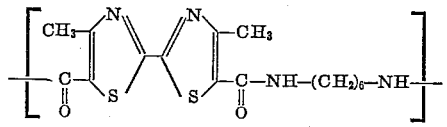

It was soluble in sulfuric acid, trifluoroacetic acid and 1,3-dichloro - 1,1,3,3 - tetrafluoroacetone hydrate. Films cast by evaporating the solvent from a solution of the polymer were white with a bluish tinge and fluoresced under ultraviolet light. They were flexible enough to be folded without damage.

A five percent solution of this polymer in dichlorotetrafluoroacetone hydrate was prepared. This solution was then absorbed on a piece of cotton fabric and allowed to dry. The cloth exhibited blue fluorescence under ultraviolet light.

Any of the polymeric products in the following table can be similarly prepared by reacting a corresponding listed diamine with an equimolar proportion of 4,4'-dimethyl-5,5'-bis(chlorocarbonyl) - 2,2' - bithiazole. The products can be similarly used.

| Reactant | Product |
|---|---|
| H₂N—(CH₂)₇—NH₂ | [—C(=O)—thiazole(CH₃)—thiazole(CH₃)—C(=O)—NH—(CH₂)₇—NH—]ₙ |
| H₂N—(CH₂)₁₀—NH₂ | [—C(=O)—thiazole(CH₃)—thiazole(CH₃)—C(=O)—NH—(CH₂)₁₀—NH—]ₙ |

Example 3

A solution of 3.211 grams (0.01 mole) of 4,4'-dimethyl-5,5'-bis(chlorocarbonyl) - 2,2' - bithiazole in 200 ml. of chloroform was rapidly added to a vigorously stirred solution of 1.362 grams (0.01 mole) of metaxylylenediamine and 202 grams (0.02 mole) of triethylamine in 250 ml. of chloroform.

The mixture was stirred for 30 minutes at room temperature and the chloroform was then removed by evaporation. The solid residue was washed with 500 ml. of water and dried under vacuum to give a yellow powder.

This material was mixed for 30 minutes in a blender with 10% aqueous sodium carbonate and then washed with water. The material was then mixed with water for 30 minutes in the blender, isolated by filtration and dried under vacuum to give a purified yellow powder having recurring units of the structure

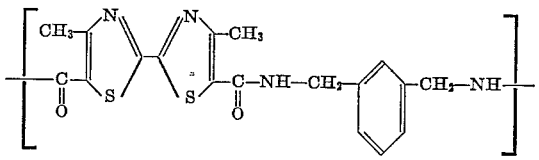

Any of the polymeric products in the following table can be similarly prepared by reacting a corresponding listed diamine with an equimolar amount of 4,4'-dimethyl-5,5'-bis(chlorocarbonyl)-2,2'-bithiazole:

| Reactant | Product |
|---|---|
| H₂NCH₂—⟨C₆H₄⟩—CH₂NH₂ | [—C(=O)—thiazole(CH₃)—thiazole(CH₃)—C(=O)—NH—CH₂—⟨C₆H₄⟩—CH₂—NH—]ₙ |
| NH₂(CH₂)₃—O—(CH₂)₃NH₂ | [—C(=O)—thiazole(CH₃)—thiazole(CH₃)—C(=O)—NH—(CH₂)₃—O—(CH₂)₃—NH—]ₙ |

Example 4

A mixture of 23.50 grams (0.01 mole) of polypropylene ether diamine, 2.02 grams (0.02 mole) of triethylamine, 70 ml. of benzene and 3.21 grams (0.01 mole) of 4,4'-dimethyl - 5,5' - bis(chlorocarbonyl)-2,2'-bithiazole was stirred for 41 hours at room temperature. The mixture was then stirred with 25 ml. of water and the cloudy, yellow upper layer decanted and evaporated on a glass panel.

The resulting polymer was a viscous liquid which emitted blue fluorescence under ultraviolet light. It had recurring units of the formula

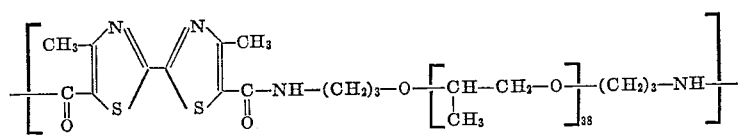

Example 5

A solution of 2.030 grams (.01 mole) of isophthaloyl chloride and 3.211 grams (.01 mole) of 4,4'-dimethyl-5,5'-bis(chlorocarbonyl) - 2,2' - bithiazole in 400 ml. of chloroform was added to a rapidly stirred solution of 3.446 grams (0.02 mole) of decamethylenediamine and 4.048 grams (0.04 mole) of triethylamine in 300 ml. of chloroform. The copolymer separated from solution almost immediately as a pale yellow solid.

The mixture was stirred for 30 additional minutes and then filtered to collect the copolymer which was then placed in one liter of boiling water for a few minutes to drive off the chloroform, collected by filtration, washed with 500 ml. of water and then dried under vacuum.

The copolymer was a pale yellow powder having recurring units of the structural formula

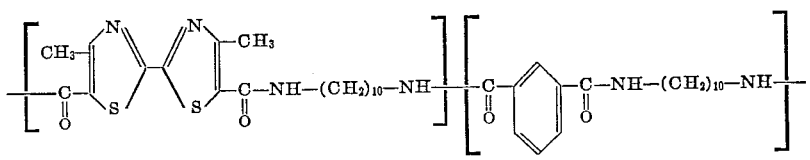

The typical blue fluorescence of the polymers of this invention was exhibited when this polymer was placed under an ultraviolet light.

Any of the polymeric products in the following table can be similarly prepared by reacting the corresponding listed reactants with 4,4'-dimethyl-5,5'-bis(chlorocarbonyl)-2,2'-bithiazole.

REACTANTS

| | Acid Chloride | Diamine |
|---|---|---|
| 1 | ClC(O)(CH₂)₄C(O)Cl | H₂N(CH₂)₂NH₂ |
| 2 | ClC(O)—C₆H₄—C(O)Cl | NH₂(CH₂)₁₀NH₂ |
| 3 | ClC(O)—[thiophene-S]—C(O)Cl | piperazine (HN⟨ ⟩NH) |

PRODUCT 1

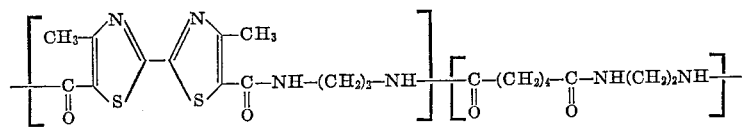

PRODUCT 2

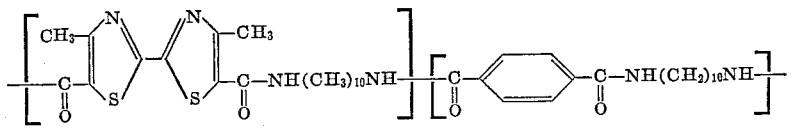

PRODUCT 3

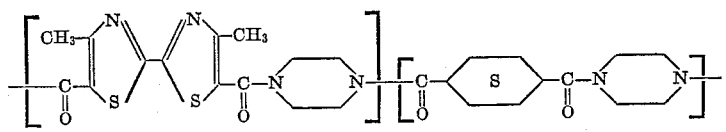

Example 6

A solution of 1.605 grams (0.005 mole) of 4,4'-dimethyl-5,5'-bis(chlorocarbonyl)-2,2'-bithiazole in 100 ml. of benzene was mixed with a solution of 5.35 grams (0.005 mole) polytetramethylene ether bis(chloroformate) of molecular weight 1070 in a 50 ml. benzene. The mixture was added rapidly to a mechanically stirred solution of 1.14 grams (0.01 mole) 2,5-dimethylpiperazine and 2.02 grams (0.02 mole) sodium carbonate in 100 ml. distilled water. The mixture was stirred for 15 minutes, then filtered to isolate the white insoluble copolymer. The copolymer was then placed in boiling water for a few minutes to remove the benzene, washed with several portions of water and dried under vacuum. The product had recurring units of the structure

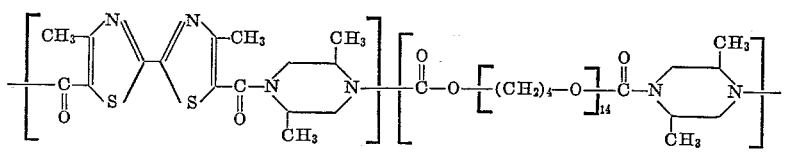

It exhibited blue fluorescence under ultraviolet light.

The following bis(chloroformate)s can be similarly used to give the corresponding copolymers:

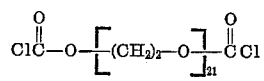

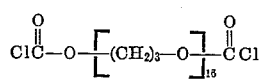

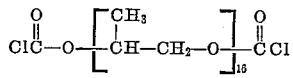

The claims are:
1. A bithiazole polymer consisting essentially of recurring units of the structure

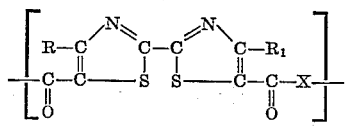

where

X is selected from the group consisting of

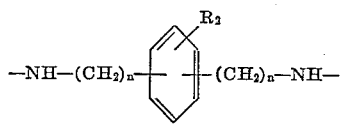

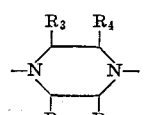

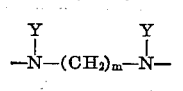

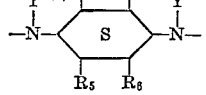

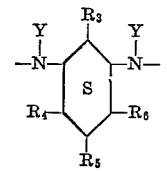

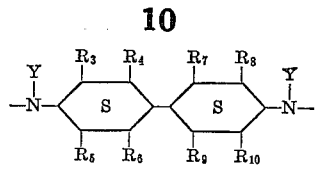

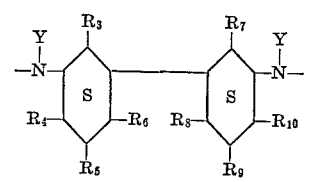

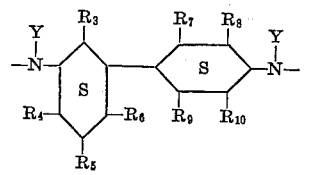

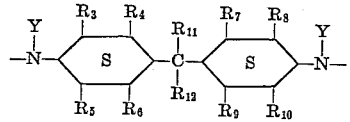

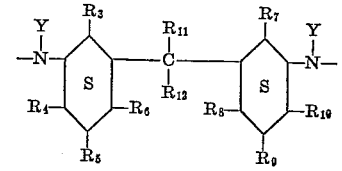

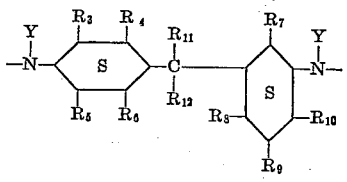

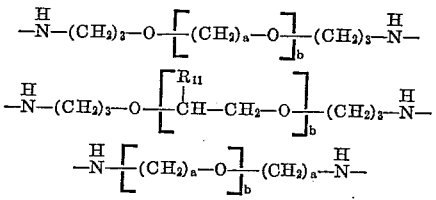

and

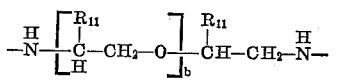

$R$–$R_{10}$ are selected from the group consisting of hydrogen, methyl and ethyl;

$R_{11}$ and $R_{12}$ are alkyl of 1 through 5 carbon atoms;

Y is selected from the group consisting of hydrogen and alkyl radicals of 1 through 20 carbon atoms;

$m$ is a number 2 through 200;

$n$ is a number 1 through 12;

$a$ is a number 1 through 4; and $b$ is a number 1 through 300.

2. A bithiazole copolymer consisting essentially of the structure

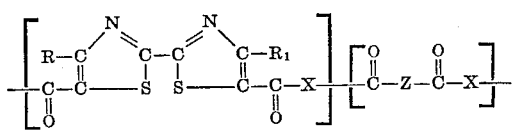

where

X is selected from the group consisting of

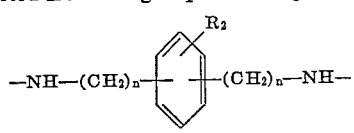

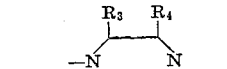

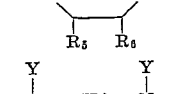

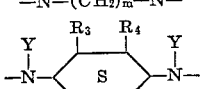

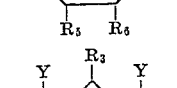

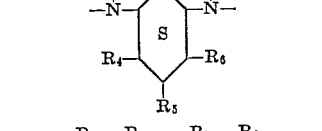

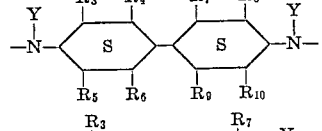

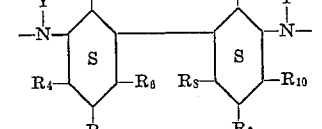

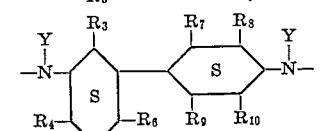

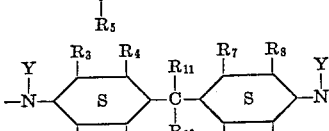

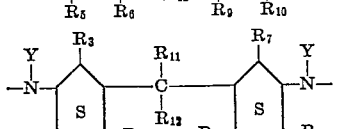

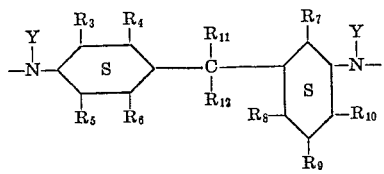

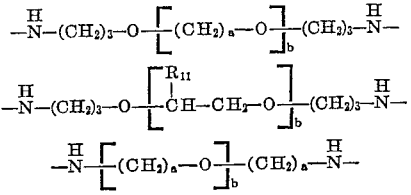

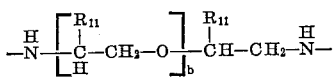

and

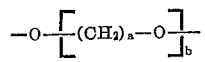

Z is selected from the group consisting of alkylene, cycloalkylene, arylene, alkarylene and aralkylene radicals, each having a total of 1 through 20 carbon atoms,

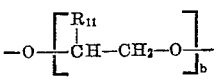

and $$-O-\left[\begin{array}{c}R_{11}\\|\\CH-CH_2-O\end{array}\right]_b-$$

where $b$ is a number 1 through 300; and
$R_{11}$ is an alkyl radical of 1 through 5 carbon atoms.

3. A polymer consisting essentially of recurring units of the structure

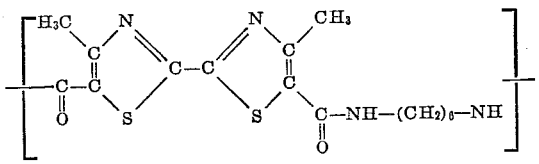

4. A polymer consisting essentially of recurring units of the structure

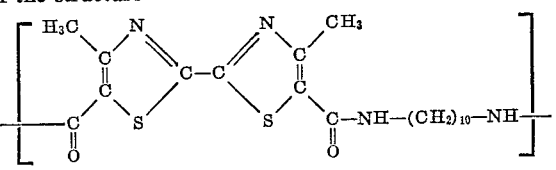

References Cited
UNITED STATES PATENTS

| | | | |
|---|---|---|---|
| 3,130,182 | 4/1964 | Frazer | 260—78 |
| 3,130,183 | 4/1964 | Frazer | 260—78 |
| 3,149,094 | 9/1964 | Fields | 260—78 |

WILLIAM H. SHORT, *Primary Examiner.*

SAMUEL H. BLECH, *Examiner.*

H. D. ANDERSON, *Assistant Examiner.*